US011271820B2

(12) United States Patent
Bhattacharjya et al.

(10) Patent No.: US 11,271,820 B2
(45) Date of Patent: Mar. 8, 2022

(54) PROXIMAL GRAPHICAL EVENT MODEL OF STATISTICAL LEARNING AND CAUSAL DISCOVERY WITH EVENT DATASETS

(71) Applicant: International Business Machines Corporation, Armonk, NY (US)

(72) Inventors: Debarun Bhattacharjya, Yorktown Heights, NY (US); Tian Gao, Yorktown Heights, NY (US); Dharmashankar Subramanian, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 435 days.

(21) Appl. No.: 16/199,090

(22) Filed: Nov. 23, 2018

(65) Prior Publication Data
US 2020/0169469 A1    May 28, 2020

(51) Int. Cl.
| H04L 12/24 | (2006.01) |
| H04L 12/26 | (2006.01) |
| H04L 29/08 | (2006.01) |
| H04L 41/142 | (2022.01) |
| H04L 67/10 | (2022.01) |
| H04L 43/16 | (2022.01) |
| H04L 41/14 | (2022.01) |

(52) U.S. Cl.
CPC .......... *H04L 41/142* (2013.01); *H04L 41/145* (2013.01); *H04L 43/16* (2013.01); *H04L 67/10* (2013.01)

(58) Field of Classification Search
CPC ....... H04L 41/142; H04L 67/10; H04L 43/16; H04L 41/145; H04L 12/24; H04L 12/26; H04L 29/08; G06N 20/00; G06N 7/005
USPC ...................................... 706/12, 25
See application file for complete search history.

(56) References Cited

U.S. PATENT DOCUMENTS

| 6,349,406 | B1 * | 2/2002 | Levine ................ G06F 11/3466 702/179 |
| 8,935,673 | B1 * | 1/2015 | Ashkenazi .......... G06F 11/3636 717/125 |
| 2009/0083207 | A1 * | 3/2009 | Aparicio, IV ......... G06N 3/049 706/46 |
| 2010/0057651 | A1 * | 3/2010 | Fung ...................... G06N 7/005 706/12 |
| 2013/0185232 | A1 * | 7/2013 | Hochstein .............. G06N 7/005 706/12 |
| 2017/0039663 | A1 | 2/2017 | Gross |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Minh Chau Nguyen
*Assistant Examiner* — Mehulkumar J Shah
(74) *Attorney, Agent, or Firm* — Peter Edwards, Esq.; McGinn I.P. Law Group, PLLC.

(57) ABSTRACT

A graphical event model method, system, and computer program product, include learning statistical and causal co-occurrence relationships among multiple event-types of data, requiring no complex input, and generating a representation that explains a mutual dynamic of the multiple event-types in a form of a graphical event model.

25 Claims, 10 Drawing Sheets

(56) References Cited

U.S. PATENT DOCUMENTS

| | | | |
|---|---|---|---|
| 2017/0102678 A1* | 4/2017 | Nixon | G05B 17/02 |
| 2017/0351241 A1* | 12/2017 | Bowers | G05B 13/048 |
| 2018/0034720 A1 | 2/2018 | Bell et al. | |
| 2018/0046926 A1* | 2/2018 | Achin | G06Q 10/04 |
| 2018/0246762 A1* | 8/2018 | Tarsa | G06F 9/5083 |
| 2019/0354457 A1* | 11/2019 | Urmanov | H04L 63/1425 |
| 2020/0019984 A1* | 1/2020 | Yuan | G06Q 30/0247 |
| 2020/0085330 A1* | 3/2020 | Di Poian | A61B 5/318 |

OTHER PUBLICATIONS

Asela Gunawardana et al., "Universal Models of Multivariate Temporal Point Processes", Proceedings of the 19th International Conference on Artificial Intelligence and Statistics (AISTATS) 2016, W& CP vol. 41.

* cited by examiner

FIG. 5

Algorithm 1 Change points in $w$ across all of piece-wise linear functions $D(\mathbf{y}, z)$

Inputs: Dataset D, Labels $X, Z$, given parent set $\mathbf{Y}$ with windows $w_{yx}, y \in \mathbf{Y}$
Outputs: $\hat{C}_{\mathbf{y},z}$, initialized to $\emptyset$
Initialize: $S = \{[t_{z,i}, t_{z,i+1}]\}_{i=1}^{N(z)}$, ordered inter-arrival intervals of $Z$, with $t_{z,N(z)+1} = T$.
for all $y$ in $\mathbf{Y}$ do
    for all $s_i = [t_{z,i}, t_{z,i+1}]$ in $S$ do
        Let: $\mathrm{cl}(s_i) = \max_k \{t_{y,k} | t_{y,k} < t_{z,i}\}$, $\mathrm{in}(s_i) = \{t_{y,k} | t_{y,k} \in (t_{z,i}, t_{z,i+1})\}$
        $\hat{C}_{\mathbf{y},z} = \hat{C}_{\mathbf{y},z} \cup$ changepoints$(s_i, \mathrm{cl}(s_i), \mathrm{in}(s_i), y)$
$\hat{C}_{\mathbf{y},z} = \hat{C}_{\mathbf{y},z} \cup \{t_{zz}^{(k)}\}$, i.e. add the set of the $N(z)$ ascending order statistics of label $Z$ inter-event times $\{t_{zz}\}$, including the inter-event time between the last arrival of $Z$ and $T$ changepoints$(s_i, \mathrm{cl}(s_i), \mathrm{in}(s_i), y)$: Initialize Stack $\sigma = \emptyset, C = \emptyset$
if $(\mathrm{cl}(s_i) + w_{yz}) < t_{z,i+1}$ then
    If $(\mathrm{cl}(s_i) + w_{yz}) \in (t_{z,i}, t_{z,i+1})$, $\sigma.\mathrm{push}(\mathrm{cl}(s_i) + w_{yz} - t_{z,i})$
    for all $t$ in $\mathrm{in}(s_i)$ do
        If $\sigma$ not empty, $\mathtt{tail} = \sigma.\mathrm{top}$, else $\mathtt{tail} = -1$
        if $t \leq \mathtt{tail}$ then
            $\sigma.\mathrm{pop}$. If $(t + w_{yz} > t_{z,i+1})$ break; Else $\sigma.\mathrm{push}(t + w_{yz} - t_{z,i})$
        else
            $\sigma.\mathrm{push}(t - t_{z,i})$. If $(t + w_{yz} > t_{z,i+1})$ break; Else $\sigma.\mathrm{push}(t + w_{yz} - t_{z,i})$
    $C = \mathrm{set}(\sigma)$
return $C$

Algorithm 2 Forward Backward Search

Inputs: Event label $X$, event dataset $D$
Outputs: parents $U$, windows $w_x$, lambdas $\lambda_{x|u}$, score such as BIC

---

Forward Search: Initialize $U = \emptyset$, $S = -\infty$
while score cannot be improved or no more parents can be added do
    for all $Z$ not in $U$ do
        Find all optimal windows and $\lambda$s with $Z$ added to $U$ and corresponding score $S(U \cup Z)$
    if $\max_Z \{S(U \cup Z)\} > S$ then
        Add $Z$ to $U$, $S = \max_Z \{S(U \cup Z)\}$

---

Backward Search: Start with parent set $U$ and $S$ from forward search
while score cannot be improved or $U = \emptyset$ do
    for all $Z$ in $U$ do
        Find all optimal windows and $\lambda$s with $Z$ removed from $U$ and corresponding score $S(U \setminus Z)$
    if $\max_Z \{S(U \setminus Z)\} > S$ then
        Remove $Z$ from $U$, $S = \max_Z \{S(U \setminus Z)\}$

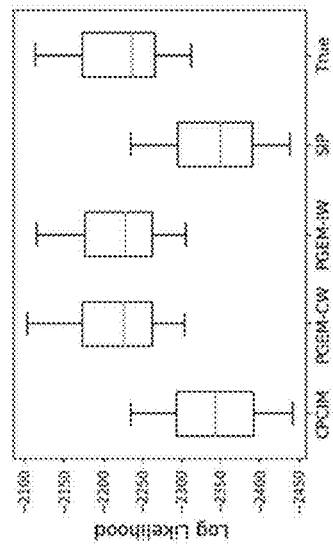
FIG. 7c PGEM #3
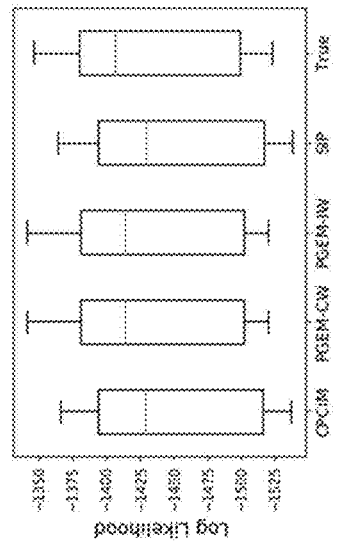
FIG. 7b PGEM #2
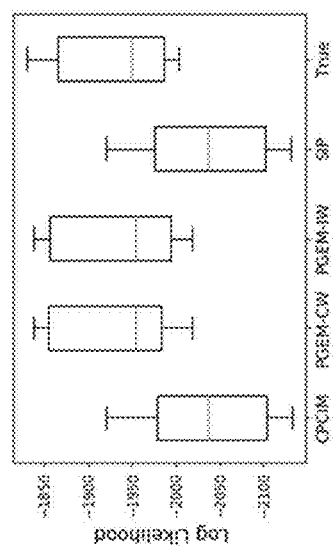
FIG. 7a PGEM #1
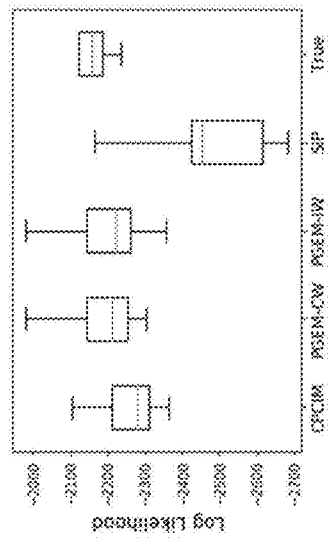
FIG. 7f PGEM #6
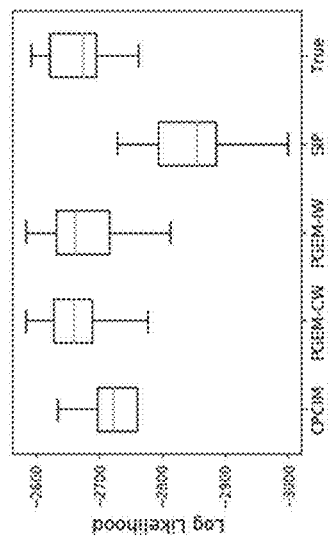
FIG. 7e PGEM #5
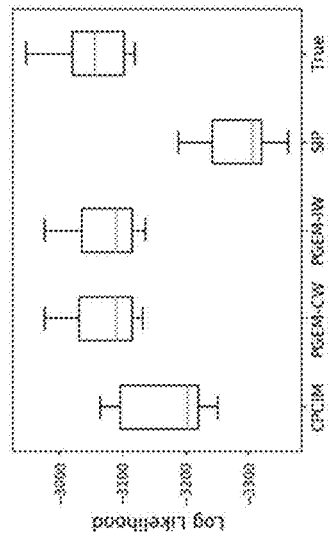
FIG. 7d PGEM #4

FIG. 8

| Books | SIP | PGEM | CPCIM |
|---|---|---|---|
| Leviathan (M = 10) | -19432 | -18870 | -19237 |
| Leviathan (M = 20) | -36398 | -35179 | -36055 |
| Bible (M = 10) | -76097 | -72013 | -72801 |
| Bible (M = 20) | -147706 | -138190 | -140327 |

FIG. 9

| Country | SIP | PGEM | CPCIM |
|---|---|---|---|
| Argentina | -11915 | -8412 | -10631 |
| Brazil | -14289 | -8856 | -11706 |
| Colombia | -4621 | -2965 | -3557 |
| Mexico | -7895 | -6011 | -5676 |
| Venezuela | -8922 | -5454 | -6757 |

PROXIMAL GRAPHICAL EVENT MODEL OF STATISTICAL LEARNING AND CAUSAL DISCOVERY WITH EVENT DATASETS

BACKGROUND

The present invention relates generally to a graphical event model method, and more particularly, but not by way of limitation, to a system, method, and recording medium for automatic transformation of complex tables in documents (e.g., Adobe®, PDF, Microsoft Word, etc.) into computer-understandable structured format.

Event datasets are sequences of events of various types that typically occur as irregular and asynchronous continuous-time arrivals. This is in contrast to time series data, which are observations of continuous-valued variables over regular discrete epochs in time. Examples of event datasets include logs, transactions, notifications and alarms, insurance claims, medical events, political events, and financial events.

Conventionally, a marked (multivariate) point process is able to capture the dynamics of events occurring in continuous time, under reasonable regularity conditions, using conditional intensity functions, which are akin to hazard rates in survival analysis and represent the rate at which an event-type occurs, conditional on the history of event occurrences. Learning arbitrary history-dependent intensity functions can be difficult and impractical, thus the conventional techniques makes various simplifying assumptions. Some examples of such point processes include continuous time noisy-or (CT-NOR) models, Poisson cascades, Poisson networks, piecewise-constant conditional intensity models, forest-based point processes, multivariate Hawkes processes, and non-homogeneous Poisson processes.

Graphical event models (GEMs) have been proposed as a graphical representation for marked point processes. Unlike graphical models for discrete-time dynamic uncertain variables such as dynamic Bayesian networks and time series graphs, GEMs capture continuous-time processes. They also differ from continuous-time Bayesian networks, which represent homogeneous Markov models (HMM) of the joint trajectories of discrete variables rather than models of event streams in continuous time. GEMs provide a framework that generalizes many of the afore mentioned history-dependent models for event datasets, many of which make the assumption of piece-wise constant conditional intensity functions.

Conventional techniques take varying approaches to the representation and learning of such functions, including decision trees, forests, and generalized linear models.

A major drawback in these conventional approaches is that they require the user to specify a set of basis functions in the form of relevant time intervals in the history. It is not obvious beforehand in most applications how to specify such a basis. Alternatively, if a basis is chosen in a manner that is exhaustively data-adaptive (i.e., using all historical epochs of event arrivals to define all historical time intervals of interest), one ends up with a prohibitively large basis set that makes any learning impractical.

Thus, there is a need in the art to investigate approaches that do not require such a basis set specification and yet provide practical learning algorithms.

SUMMARY

In view of the technical problems in the art, the inventors have invented a technical improvement to address the technical problem that includes proximal graphical event models (PGEMs) where the intensity of an event label depends on occurrences of its parent event labels in the graph within the most recent history (i.e., in temporal proximity). The technical improvement of using PGEMs has several advantages including that they are practical models, capturing the assumption that the most recent history is sufficient for understanding how the future may unfold. Also, PGEMs are particularly interpretable event models and are useful for providing insights about the dynamics in an event dataset to political, financial analysts, medical practitioners, and scientists. Moreover, the invention includes data-driven algorithms that learn a PGEM from an event dataset without additional user information, unlike the state-of-the-art conventional models. Additionally, the invention presents polynomial time heuristic algorithms that make PGEM learning computationally more tractable and therefore amenable to large event datasets, possibly with a large number of event types.

In an exemplary embodiment, the present invention can provide a computer-implemented graphical event model method, the method including learning statistical and causal co-occurrence relationships among multiple event types of data, requiring no complex input, and generating a representation that explains a mutual dynamic of the multiple event types in a form of a graphical event model.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 5 exemplarily depicts a first algorithm for change points in w (windows) across all of piece-wise linear functions D(y, z) according to an embodiment of the invention;

FIG. 6 exemplarily depicts a second algorithm for a forward backward search according to an embodiment of the present invention;

FIGS. 7a-7f exemplarily depict model comparisons with ten synthetic event datasets generated from six PGEMs according to an embodiment of the present invention;

FIG. 8 exemplarily shows a log likelihood table results of models for experiments on books according to an embodiment of the present invention;

FIG. 9 exemplarily shows a log likelihood table results of models for experiments on ICEWS Dataset;

DETAILED DESCRIPTION

Figure 1:
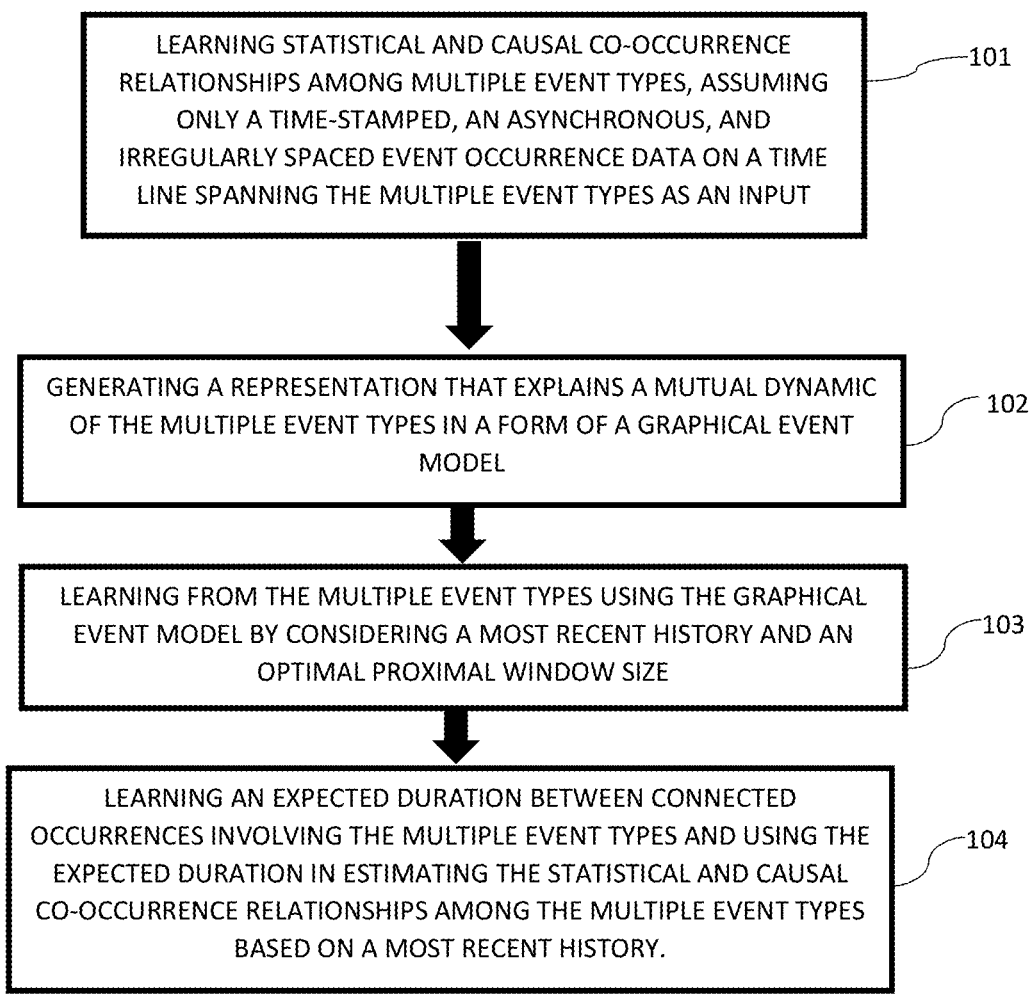
FIG. 1 exemplarily shows a high-level flow chart for a graphical event model method 100.

The invention will now be described with reference to FIG. 1-12, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the graphical event model method 100 includes various steps for using a special graphical model for quantifying event causal and co-occurrence relationships, extending and adapting graphical event models to work with the most recent event history, hence proximal graph event model (PGEM) and free of hand-tuning hyper parameters, to provide a more effective and efficient way to model event relationships, using new and novel efficient methods to learn window sizes in the data with justifiable analysis, using new and novel efficient methods to identify parent nodes of each event in the data with justifiable analysis, and using a sound and complete forward and backward search, with efficient algorithms amenable to large event datasets, to learn PGEM's graph structure.

Figure 10:
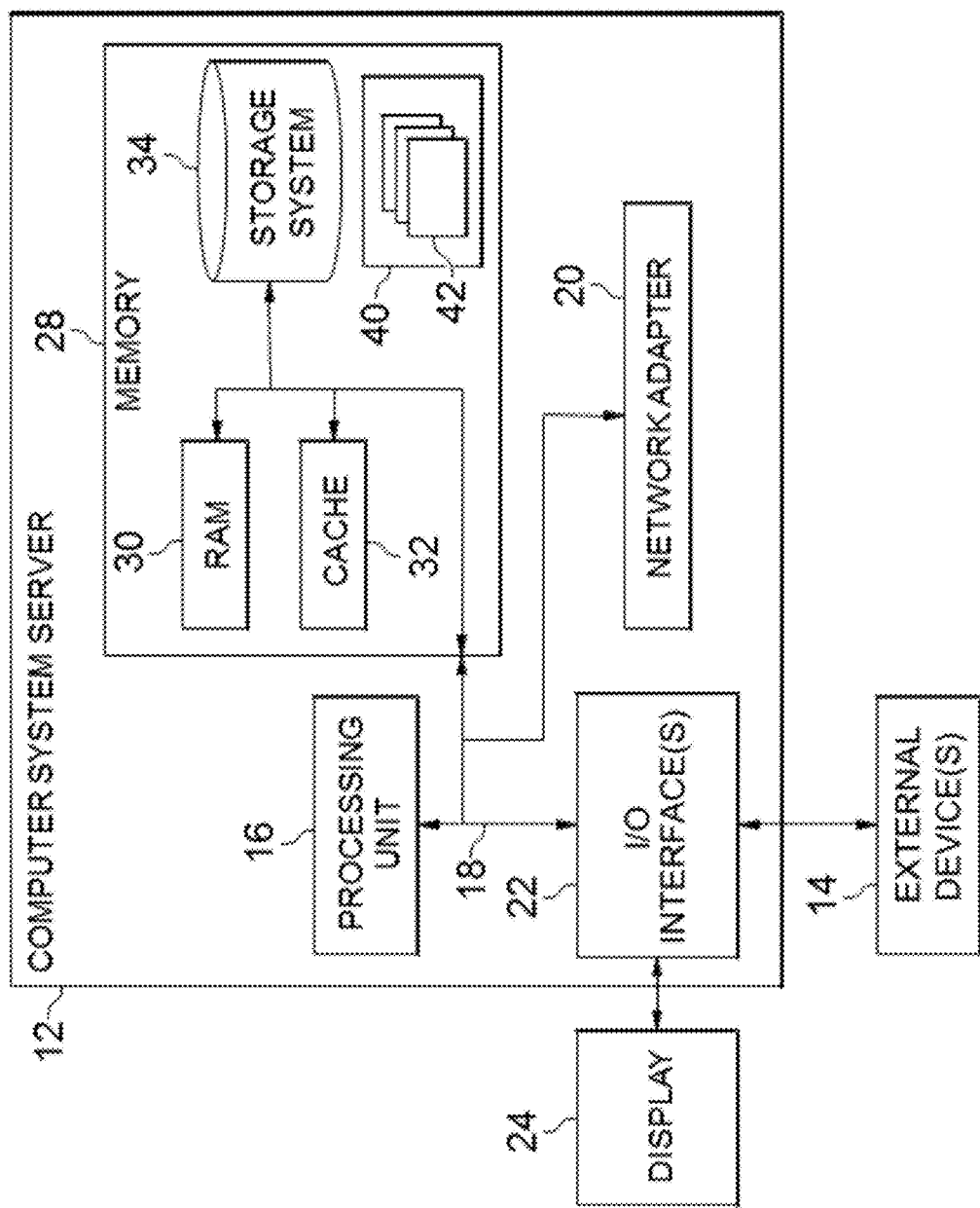
FIG. 10 depicts a cloud computing node 10 according to an embodiment of the present invention.

As shown in at least FIG. 10, one or more computers of a computer system 12 according to an embodiment of the present invention can include a memory 28 having instructions stored in a storage system to perform the steps of FIG. 1.

Although one or more embodiments (see e.g., FIGS. 10-12) may be implemented in a cloud environment 50 (see e.g., FIG. 11), it is nonetheless understood that the present invention can be implemented outside of the cloud environment.

With reference generally to FIGS. 1-9, the invention learns statistical and causal relationships between event types in the form of graphical models using event datasets. The event datasets include occurrences of various event types over time. For example, the event datasets include web logs, customer transactions, network notifications, political events, financial events, insurance claims, health episodes, other medical events, etc. Conventional techniques assume piece-wise constant conditional intensity functions which are limited because a user needs to provide "basis functions" (i.e., in the form of relevant historical time intervals that could matter). The invention herein creates practical and interpretable model(s) for insights about the process by using a data-driven approach with no user inputs required that allows for efficient algorithms amenable to large event datasets.

Figure 2:
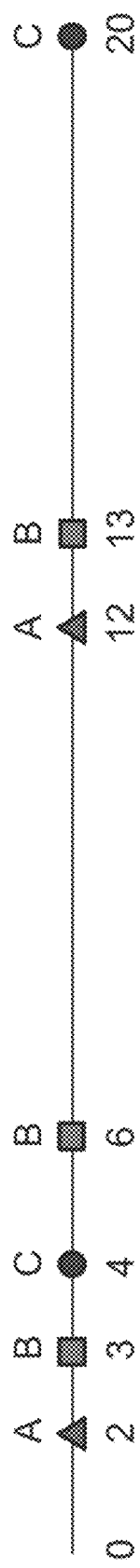
FIG. 2 exemplarily depicts an event dataset for an example involving M=3 event labels for implementing the method 100 according to an embodiment of the present invention.

An event dataset is denoted $D=\{(l_i, t_i)\}_{i=1}^{N}$, where $t_i$ is the occurrence time of the $i^{th}$ event, $t_i \in R^+$, and is an event label/type belonging to a finite alphabet L with cardinality $|L|=M$. One assumes a temporally-ordered dataset, $t_i < t_j$ for $i<j$, with initial time $t0=0 \leq t_i$ and end time $t_{N+1}=T \geq t_N$, where T is the total time period. FIG. 2 shows an example event dataset with N=7 events from the event label set L={A, B, C} over T=20 days.

The invention includes learning algorithms that are data-driven. Specifically, the invention relies on inter-event times between event labels in the dataset. The set of times are denoted from the most recent occurrence of Z, if Z has occurred, to every occurrence of X (Z X) as $\{i_{zx}\}$. The inventors use $\{i_{zz}\}$ to denote inter-event times between Z occurrences, including the time from the last occurrence of Z to the final time T. In the FIG. 2 example, $\{\tilde{t}_{ac}\}=\{2, 8\}$, $\{\tilde{t}_{bc}\}=\{1, 7\}$ and $\{\tilde{t}_{bb}\}=\{3, 7, 7\}$.

The event dataset is modeled using marked point processes, whose parameters are conditional intensity functions. In the most general case, the conditional intensity for event label X is a function of the entire history, $\lambda_x(t|h_t)$, where $h_t$ includes all events up to time t, $h_t=\{(l_i, t_i): t_i \leq t\}$. Lower case x is used wherever with reference to label X in subscripts or parentheses. A graphical representation of a marked point process can help specify the historical dependence. For graph G=(L, E) where nodes correspond to event labels, the conditional intensity for label X depends only on historical occurrences of its parent event labels. Therefore $\lambda_x(t|h_t)=\lambda_x(t|[h(U)]_t)$, where U are parents of node X in G and $[h(U)]_t$ is the history restricted to event labels in set U. It is noted that nodes and event labels are referred to interchangeably and have the same meaning.

A proximal graphical model M includes a graph along with a set of (time) windows and conditional intensity parameters, $M=\{G, W, \Lambda\}$. There is a window for every edge in the graph, $W=\{w_x: \forall X \in L\}$, where $w_x=\{w_{zx}: \forall Z \in U\}$ denotes the set of all windows corresponding to incoming edges from X's parents U. $\Lambda=\{\lambda_{x|u}^{w_x}: \forall X \in L\}$ is the set of all conditional intensity parameters.

Figure 3:
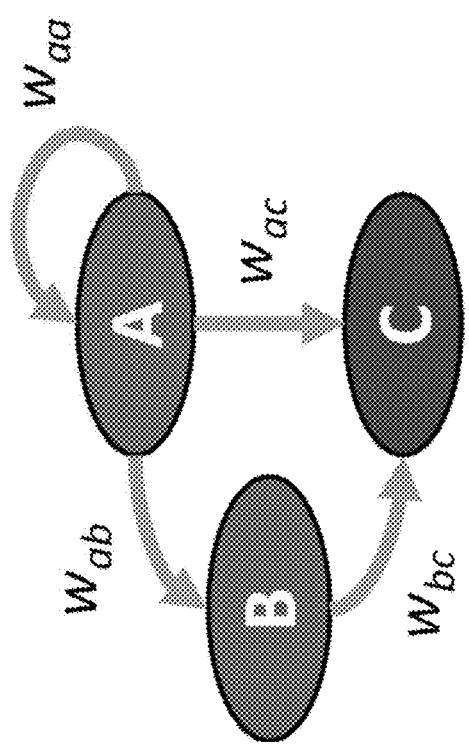
FIG. 3 exemplarily shows a PGEM for the example involving M=3 event labels for implementing the method 100 according to an embodiment of the present invention.

For node X, there is a parameter for every instantiation u of its parent occurrences, depending on whether a parent event label has occurred in its window. Thus, there are 2|U| parameters for X, making the PGEM parametrization analogous to a Bayesian network with binary variables. To avoid notational clutter, the window superscript for conditional intensities is hidden. FIG. 3 provides an illustrative PGEM graph along with the windows. In FIG. 3, parameter $\lambda_{c|ab}$ signifies the rate at which C occurs at any time t given that A has occurred at least once in the interval $[t-w_{ac}, t)$ and that B has not occurred in $[t-w_{bc}, t)$.

The learning problem for learning the PGEM is as follows: given an event dataset D, estimate a PGEM $M=\{G, W, \Lambda\}$ (i.e., parents, windows, and conditional intensity parameters for each event label).

For learning windows, when the parents U of all nodes X are known, the log likelihood of an event dataset given a PGEM can be written as equation (1) in terms of the summary statistics of counts and durations in the data:

$$\log L(D) = \sum_X \sum_u (-\lambda_{x|u} D(u) + N(x; u) \ln(\lambda_{x|u})) \qquad (1)$$

where N(x; u) is the number of times that X is observed in the dataset and that the condition u (from $2^{|U|}$ possible parental combinations) is true in the relevant preceding windows, 104 and D(u) is the duration over the entire time period where the condition u is true. In equation (1), $\lambda_{x|u}$ are conditional intensity rates; it can be shown that the maximum likelihood estimates $$\lambda_{x|u} = \frac{N(x; u)}{D(u)}.$$

The following theorem (1) uses this to provide a high-level recipe for finding optimal windows for a node given its parents. N(x) denotes counts of event label X in the data.

And, $N(x; u) = \Sigma_{i=1}^{N} I(l_i=X) I_u^{w_x}(t_i)$ and $D(u) = \Sigma_{i=1}^{N+1} \int_{t_{i-1}}^{t_i} I_u^{w_x}(t) dt$, where (t) is an indicator for whether u is true at time t as a function of the relevant windows $w_x$. Note that the dependence of the summary statistics on windows $w_x$ is hidden for notational simplicity.

theorem (1) is based on that the log likelihood maximizing windows for a node X with parents U are those that maximize the KL divergence between a count-based distribution with probabilities $$\frac{N(x; u)}{N(x)}$$

and a duration-based distribution with probabilities $$\frac{D(u)}{T}.$$

It is noted that for each time $t \in [0, T]$, there is some one parental state $u(h_t, w_x)$ that is active. Since the number of such parental states over [0, T] is finite (upper bounded by $2^{|U|}$, and possibly further limited by what the data D and windows $w_x$ allow), this leads to a finite partition of [0, T]. Each member in this partition corresponds to some parental state u, and in general, it is a union of a collection of non-intersecting half-open or closed time intervals that are subsets of [0, T]. Each member thus has a net total duration, which sums to T across the above partition, and similarly a net total count of the number of arrivals of type X. As such, $w_x$ taken with D is equivalent to two finite distributions (histograms) whose support is the above set of partition members, namely one each for counts and the durations. The above theorem observes that the optimal $w_x$ is one where the count histogram across the partition members maximally differs from the corresponding duration histogram, as per KL divergence.

Theorem (2) provides an upper bound on the optimal window from parent Z to node X regardless of other considerations. Theorem (2) assumes that the log likelihood maximizing window $w_{zx}$ from parent Z to a node X is upper bounded by $\max\{t^{\hat{}}_{zz}\}$, where $\{\hat{}\}$ denotes inter-event times, which is also taken to include the inter-event time between the last arrival of Z and T (end of the horizon).

Figure 4:
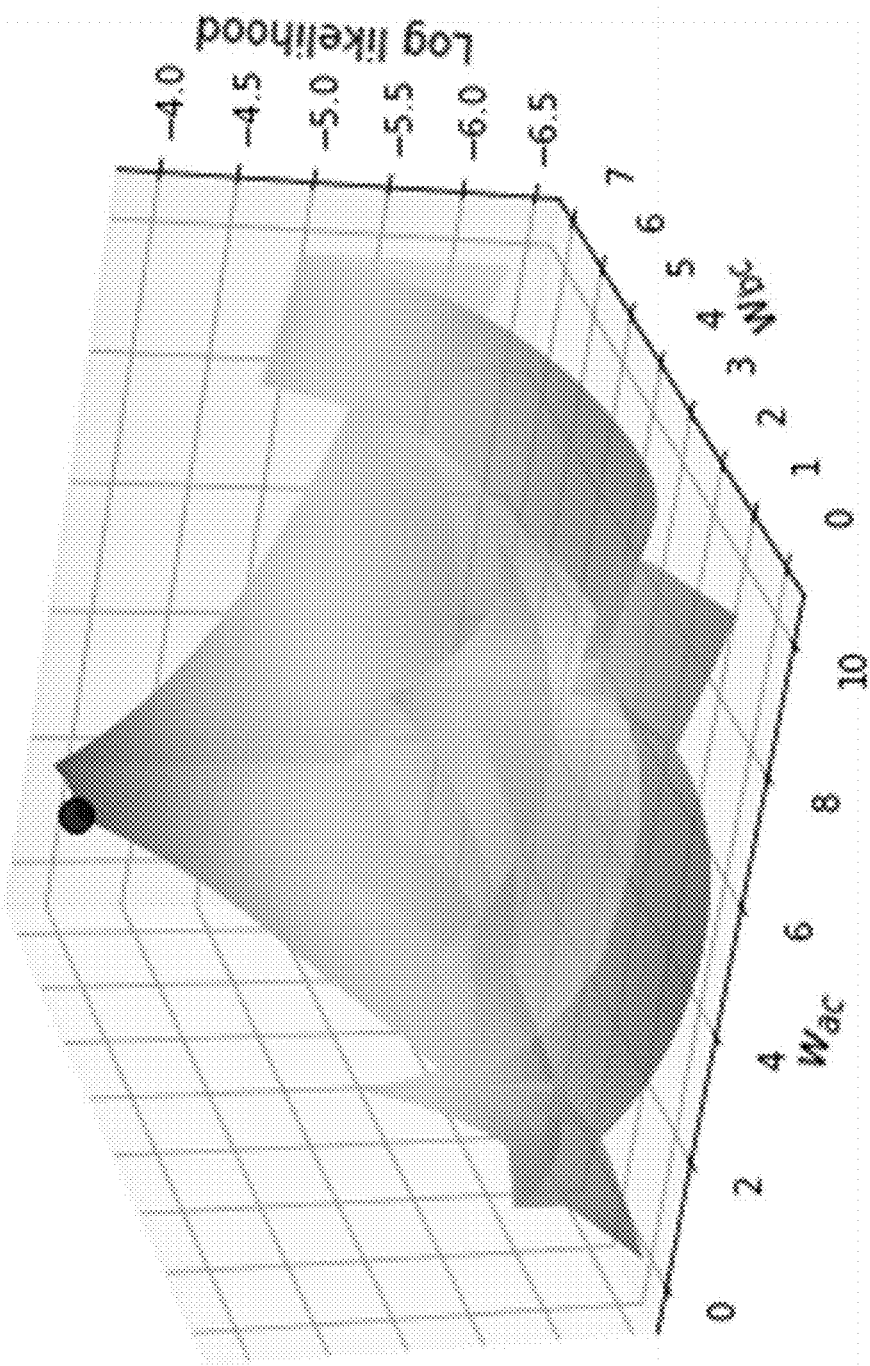
FIG. 4 exemplarily depicts a surface plot of a log likelihood for node C of FIG. 2, given parents A and B, as a function of windows $w_{ac}$ and $w_{bc}$ according to an embodiment of the invention.

FIG. 4 displays the shape of the log likelihood function for node C as a function of windows from its parents A and B in the PGEM from FIG. 3. Note that the maximization over regionally convex areas results in several local maxima. The following theorem (3) shows that when a node has a single parent, one can discover a small number of local maxima from the inter-event times in the data, thereby easily computing the global maximum by exhaustively comparing all local maxima. Theorem (3) stands for a node X with a single parent Z, the log likelihood maximizing window $w_{zx}$ either belongs to or is a left limit of a window in the candidate set $W^* = \{t^{\hat{}}_{zx}\} \cup \max\{t^{\hat{}}_{zz}\}$, where $\{t^{\hat{}}\}$ denotes inter-event times.

Theorem (4) provides that for a node X and parent(s) Y, the log likelihood maximizing window for a new parent Z, $w_{zx}$, given the windows corresponding to nodes from Y to X, either belongs to or is a left limit of a window in the candidate set $W^* = \{t^{\hat{}}_{zx}\} \cup C^{\hat{}}_{y,z}$, where $\{t^{\hat{}}\}$ denotes inter-event times and $C^{\hat{}}_{y,z}$ are change points across the set of the piecewise linear functions D(y, z) (multiple functions, due to multiple parental state combinations) obtainable from Algorithm 1 as shown in FIG. 5. $C^{\hat{}}_{y,z}$ captures all the change points that are pertinent to any of the functions D(y, z) when w is varied over [0, W], where W is an upper bound on the optimal w (theorem (2)). Theorems (3) and (4) are used in heuristics for finding the optimal windows and parameters given a parent set.

It is noted that a Bayesian information criterion (BIC) score in the experiments, is defined for a PGEM as equation (2):

$$BIC(D) = \log L(D) - \ln(T) \sum_X 2^{|U|} \quad (2)$$

The invention includes a way to discard parent sets for a node in PGEM. That is, let X be an arbitrary node of G, a candidate graph for PGEM, where the parent set of X, is U'. If $U \subset U'$ such that $s_X(U) > s_X(U')$, where s is BIC, AIC, BD, or derived criteria, then U' is not the parent set of X in the optimal PGEM graph. While this provides a way to eliminate low scoring structures locally, one still needs to compute the scores of all possible parent sets and then remove the redundant ones. The computation still n×2n asymptotic score computation and storage requirements for parent scores (although the space is reduced after applying the above technique). The technique focuses on BIC scores but similar results may hold for other scores. Since BIC is decomposable, the local BIC score for X is $s_X(U) = L_X(U) - t_i(U)$, where $L_X(U)$ is the likelihood score and $t_X(U)$ is the structure penalty.

Theorem (6) provides that using BIC as score function s, and suppose that X and U are such $$2|U| > \frac{N(x)(1 - \ln N(x))}{\ln T} + N(x),$$

where: $2^{|U|}$ is the total size of all possible parent combinations, N(x) is the total number of times event X appeared and T is the maximal time horizon. If U' is a proper superset of U, then U' is not the parent set of X in the optimal PGEM graph. Theorem (6) is used with a corollary (1) which uses BIC as the score function, the optimal graph G* has at most $O(\log_2 N(x))$ parents for each node X. Theorem (6) and corollary (7) ensures that one only needs to compute $$O\left(\sum_{k=0}^{\log_2 N(x)} \binom{M-1}{k}\right)$$

elements for each variable X.

Theorem (8) does not directly improve the theoretical size bound of the parent set size that is achieved by corollary (1), but it helps in practice as it is applicable to cases where theorem (6) is not, applicable implying even fewer parent sets need to be tested. Theorem (8) provides that using BIC as score function s, let X be a node with two possible parent sets $U \subset U'$ such that $t_X(U') + s_X(U) > 0$. Then U' and all its supersets $U'' \supset U'$ are not optimal parent sets for X in the optimal PGEM graph.

Hence, theorem (8) can be used to discard additional parents sets without computing its local scores. Every time the score of a parent set U of X is about to be computed, one can take the best score of any its subsets and test it against the theorem. If the condition applies, then one can safely discard U and all its supersets. To summarize, one would need to build all possible parent sets up to $O(\log_2 N(x))$ for each X and then use theorem (8) and then use the above technique to test the optimal parent set.

To learn the structure of the PGEM, a forward-backward search (FBS) algorithm is used as shown in Algorithm 2 of FIG. 6. Since a PGEM can include cycles, there are no acyclicity constraints like in Bayesian networks, therefore one can run Algorithm 2 of FIG. 6 on each node/label X separately. This local learning approach is similar to local learning in Bayesian networks but can contain cycles.

Given an event data set D and a target label X, FBS first initializes the parent set U to be empty. At each step of a forward search, FBS iteratively chooses a parent candidate Z that is not in U, and finds the best window and rates λ that maximize the score $S(U \subset Z)$ with parent set $U \subset Z$ (as discussed in learning the windows). If the maximized $S(U \subset Z)$ is better than the current best score S, then FBS chooses to add Z to U and update S. It runs until all variables have been tested or no parent set would improve the score (as discussed in the optimal parent search set). Then, during the backward search step, FBS iteratively tests if each variable Z in U can be removed (i.e., if the removed set U\Z would give a better score). If so, then Z would be removed from U. The backward search runs until score S cannot be improved or until U becomes empty.

With the optimal parent set search with bounded sizes and determination of optimal windows and conditional intensity rates given a graph, one can show the soundness and completeness of Algorithm 2 of FIG. 6 under mild assumptions. Assuming that the underlying distribution can be captured uniquely by a PGEM model, then since PGEMs can be considered a sub-class of this family and Algorithm 2 is a similar forward-and-backward search, soundness and completeness applies in this instance as well.

For theorem (9), under the large sample limit and no detailed balance assumptions, Algorithm 2 is sound and complete. Jointly optimizing the windows for multiple parents simultaneously is a hard problem in general. The invention instead realizes two efficient heuristics based on the above FBS procedure, namely FBS-IW and FBS-CW. In FBS-IW, the invention independently optimizes the window for each parent relative to label X, using the finite characterization of single-parent optimal windows presented in theorem (3). After each individual parent's window has been independently optimized, the invention computes the corresponding finite partition of [0, T] in terms of parental states, and use the sufficient statistics in each partition member to estimate the corresponding conditional intensity rates. In FBS-CW, one appeal to theorem (4) and realize a block coordinate ascent strategy (over parent labels) for optimizing the windows. For each parent that is added in the forward search, one optimizes its window while keeping all the other existing parents fixed at their current windows. The rate estimation is then as described above for FBS-IW. One adds parents in the forward search if there is a score improvement based on the new windows and rates. For the backward search, one deletes a parent, retains existing windows for remaining parents and only re-computes the intensity rates in both FBS-IW and FBS-CW. And, under theorem (10), if all event labels occur in the dataset in similar proportions, then the worst case complexity of the FBS-IW and FBS-CW algorithms are $O(N^2+M^3N)$ and $O(M^3N^2)$, respectively.

With reference back to FIG. 1, the method 100 utilizes the theorems, corollary, and other techniques discussed above to produce a PGEM. In step 101, statistical and causal co-occurrence relationships are learned among multiple event-types, assuming only a time-stamped, an asynchronous, and irregularly-spaced event occurrence data on a time line spanning the multiple event-types as an input.

No further hyper parameters or any other type of complex input from the user (such as basis functions) are required.

In step 102, a representation is generated that explains a mutual dynamic of the multiple event types in a form of a graphical event model. That is, interpretable, practicable representations are generated that explain the mutual dynamics of multiple events in the form of a graphical event model. It is noted that, parents in the graphical event model affect and influence the instantaneous rate of observing a child event type's occurrence, and such dependence is automatically learnt from the history of past parent event-type occurrences.

In step 103, learning from the multiple event-types is performed using the graphical event model by considering a most recent history and an optimal proximal window size.

And in step 104, learning an expected duration between connected occurrences involving the multiple event types is performed using the expected duration in estimating the statistical and causal co-occurrence relationships among the multiple event-types based on a most recent history.

In one embodiment, a model fitting score is due to a proximal conditional intensity model that estimates the conditional instantaneous intensity (or arrival rate) of the child event-type from data (i.e., intensity that is conditional on both the presence as well as the absence of the parent event-types in a specified historical time window) with the assumption of a piece-wise constant (e.g., Poisson) intensity for event arrival rate of the successor event type, with a different constant intensity corresponding to each parent-configuration state (absent/present of each parent in the specified time window). The mathematical details are described above such as in equation (1).

In another embodiment, the model for event relationships may be due to a method that computes via an optimal window search that bounds the range of possible impacting history (e.g., see theorems (2), (3), and (4)), via an optimal parent search that bounds the number of parents or cause event-types for any event-type in the data (e.g., see theorems (5), (6), and (7)), and via a forward and backward search to iteratively find the optimal PGEM graph structure (e.g., see algorithm 2 of FIG. 6 and theorem (9)). One, each, or a combination of two of the three can be used.

The data is multivariate/marked asynchronous event stream data, where each event has a time-stamp and a complex object that serves as a "mark". The "mark" includes at type of event-related detail such as relational (also known as "dyadic") event includes information like (Actor 1<Action>Actor 2) that may also be hierarchically organized and may include location.

To exemplarily show the experimental results of the invention, two baselines are considered for the experiments. A superposition of independent Poisson (SIP) arrivals is a weak baseline that treats every event label as an independent Poisson process and is equivalent to a PGEM without edges. The CPCIM algorithm is also tested, shown to be an improved version over piecewise constant intensity model (PCIM) and other variants, to compare the performance of the algorithm. For CPCIM, hyper parameters of the conjugate prior for conditional intensity has two parameters are used, the pseudo-count a and pseudo-duration β for each label. The same values for all labels are used, by computing a ratio ρ of the total number of all arrivals over all labels to the total duration for all labels (the product of the number of labels and the horizon T under consideration). This ratio provides an empirically-based estimate of the arrival rate. The experiments are run using α=Kρ, β=K, for various values of K=10, 20, . . . , where higher values of K correspondingly increase the influence of the prior on the results. Experimental results presented are for K=20. The structural prior κ was fixed at 0.1. Experiments are also run with MFPP which is based on random forests, but one observed high sensitivity to forest parameters as well as randomness in the optimized log likelihood values which went to negative infinity in many runs. Therefore, present comparisons are with only SIP and CPCIM in the experiments. Both PGEM learning algorithms use e=0.001 to search for left limiting points.

The PGEMs are generated for a label set L of size M through the following process. For each node, the number of its parents K are selected uniformly from the parameters Kmin≥0, . . . , Kmax≤M in integer increments; a random subset of size K from L is then chosen as its parent set. Windows are generated for each edge uniformly from $w_{min}$ to $w_{max}$ in increments of Δw. For the conditional intensity rates, it is assumed that each node's parent either has a multiplicative amplification or damping rate beyond a baseline rate of r/M (r=1 implies an overall rate of one label per time period in the dataset). Nodes that always increase an occurrence rate for their children are obtained by randomly choosing a subset LA of size KA from L. Nodes in the sets LA and L\LA have an amplification and damping rate of γA and γD, respectively.

FIGS. 7a to 7f compare models using six PGEMs generated from the afore-mentioned process. The top and bottom rows have PGEMs with M=5 and M=10 labels, respectively. For each model, 10 event datasets are generated over T=1000 days (around 3 years) from a synthetic PGEM generator. Windows were chosen to range from between a fortnight (14 days) to two months. For CPCIM, intervals are used of the form [t–t*, t) as basis functions, where t*∈{1, 2, 3, 4, 5, 6, 7, 15, 30, 45, 60, 75, 90, 180}. The boxplots indicate that the PGEM learning algorithms beat the baselines and come close to matching the log likelihood of the true model on the datasets. It is observed in these and other experiments that the PGEM learning algorithms perform comparably, and is therefore only the more efficient FBS-IW algorithm is considered in subsequent experiments.

With reference to FIG. 8, two books from the SPMF data mining library are considered as Leviathan, a book by Thomas Hobbes from the 1600 s, and the Bible. The 100 most frequent words are ignored to remove stop-words and only retain the next most frequent M words. This provides the observer with large event datasets where every word in scope is an event label and its index in the book is the occurrence time. For the Bible with M=20, there are N=19009 words. FIG. 8 shows that PGEM has greater log likelihood than the baselines on the four datasets considered. For CPCIM, intervals are used of the form [t–t*, t) as basis functions, where t*∈{25, 50, 100, 200, 300, 400, 500, 1000, 5000}. These datasets revealed to the inventors how challenging it could be to identify basis functions, thereby reinforcing the benefits of PGEMs.

From FIG. 8, it is seen that PGEM outperforms both SIP and CPCIM consistently on the book datasets, while CPCIM is better than SIP. PGEM achieves the best result on all four datasets, with the smallest margin of 400 in LL and up to 2000 over CPCIM.

With reference to FIG. 9, the Integrated Crisis Early Warning System (ICEWS) is considered for a political relational-event dataset, where events take the form 'who does what to whom', i.e. an event z that involves a source actor az performing an action/verb vz on a target actor a·z, denoted z=(az, vz, a'z). In ICEWS, actors and actions come from the Conflict and Mediation Event Observations (CAMEO) ontology. Actors in this ontology could either be associated with generic actor roles and organizations (e.g., Police (Brazil)) or they could be specific people (e.g., Hugo Chavez). Actions in the CAMEO framework are hierarchically organized into twenty high-level base-coded actions that range 1-20. For the experiment, attention is restricted to five countries, namely, Brazil, Argentina, Venezuela, Mexico and Colombia over a four year time period, Jan. 1 2012 to Dec. 31, 2015. Only five types of actors are included, namely, Police, Citizen, Government, Head of Government and Protester, normalizing for actual heads of governments (i.e. mapping Hugo Chavez to Head of Government (Venezuela)). Five types of actions are considered, namely, Neutral [1-2], Verbal cooperation [3-5], Material cooperation [6-8], Verbal conflict [9-13] and Material conflict [14-20], where the numbers in the brackets show how the action categories map to the CAMEO codes. For CPCIM, intervals of the form [t–t*, t) are used as basis functions, where t*∈{7, 15, 30, 45, 60, 75, 90, 180}. From FIG. 8, it is seen that PGEM outperforms both SIP and CPCIM on four out of five countries, while CPCIM is better than PGEM for Mexico.

Thus, the method 100 introduces a novel model for event datasets—proximal graphical event models. The invention uses a special graphical model for quantifying event causal and co-occurrence relationships, by proposing a new approach to learn the graph. This is the first time that such an approach has been proposed to improve graphical models and learning. This idea is possible due to the fact that the most recent history has more impact. The invention further extends and adapts graphical event models to work with the most recent event history, hence proximal graph event model (PGEM) and free of hand-tuning hyper parameters, to provide a more effective and efficient way to model event relationships. This has a precedent in event data modeling, but traditionally a user needs to provide "basis functions" (in the form of relevant historical time intervals that could matter) which can be arbitrary and erroneous, which the inventive approach eliminates. The invention PGEM overall is a data-driven approach with no user inputs required, which is also more practical and interpretable than existing graph event models.

Moreover, the invention uses new and novel efficient methods to identify parent nodes of each event in the data with justifiable analysis and the invention further uses novel efficient methods to learn window sizes in the data with justifiable analysis. This is the first analysis of window parameters in PGEM and is also the first approach to automatically determine the window sizes without basis functions. And, the invention extends to a graphical event mode, and is the first approach to utilize score objective to improve efficiency.

And, the invention uses a sound and complete forward and backward search, with efficient algorithms amenable to large event datasets, and to learn PGEM's graph structure. This is the first graph structure learning algorithm applied to PGEM.

Therefore, the invention can learn from data (without a domain) how types of events depend on each other and model how they affect each other. This includes temporal dynamics (e.g., "does A happen because of B and C happening at a same time?").

Consider an application in healthcare where there is data about 3 types of events associated with patients: prescription refills, hospital admissions, and home health visits. The invention could learn a PGEM from the data, enabling someone who may not have domain knowledge to understand the relationships between these 3 event types. For instance, the model may show that prescription refills only depend on whether a prior refill has occurred in the last month and on whether the patient was admitted to the hospital in the last week. Note that the invention includes an approach that learns the structure of the model along with parameters such as the time windows of influence.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 10, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
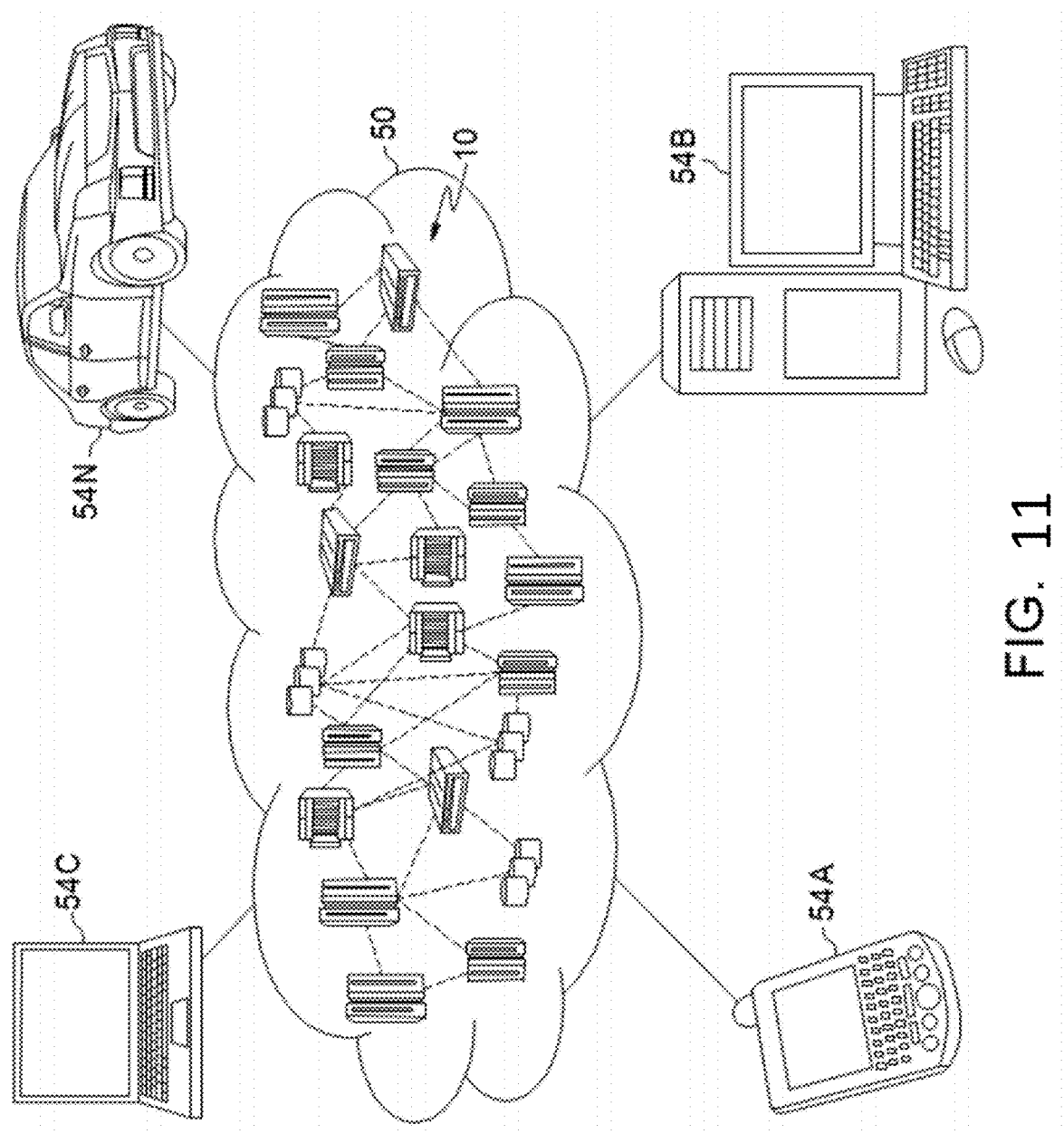
FIG. 11 depicts a cloud computing environment 50 according to an embodiment of the present invention.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Figure 12:
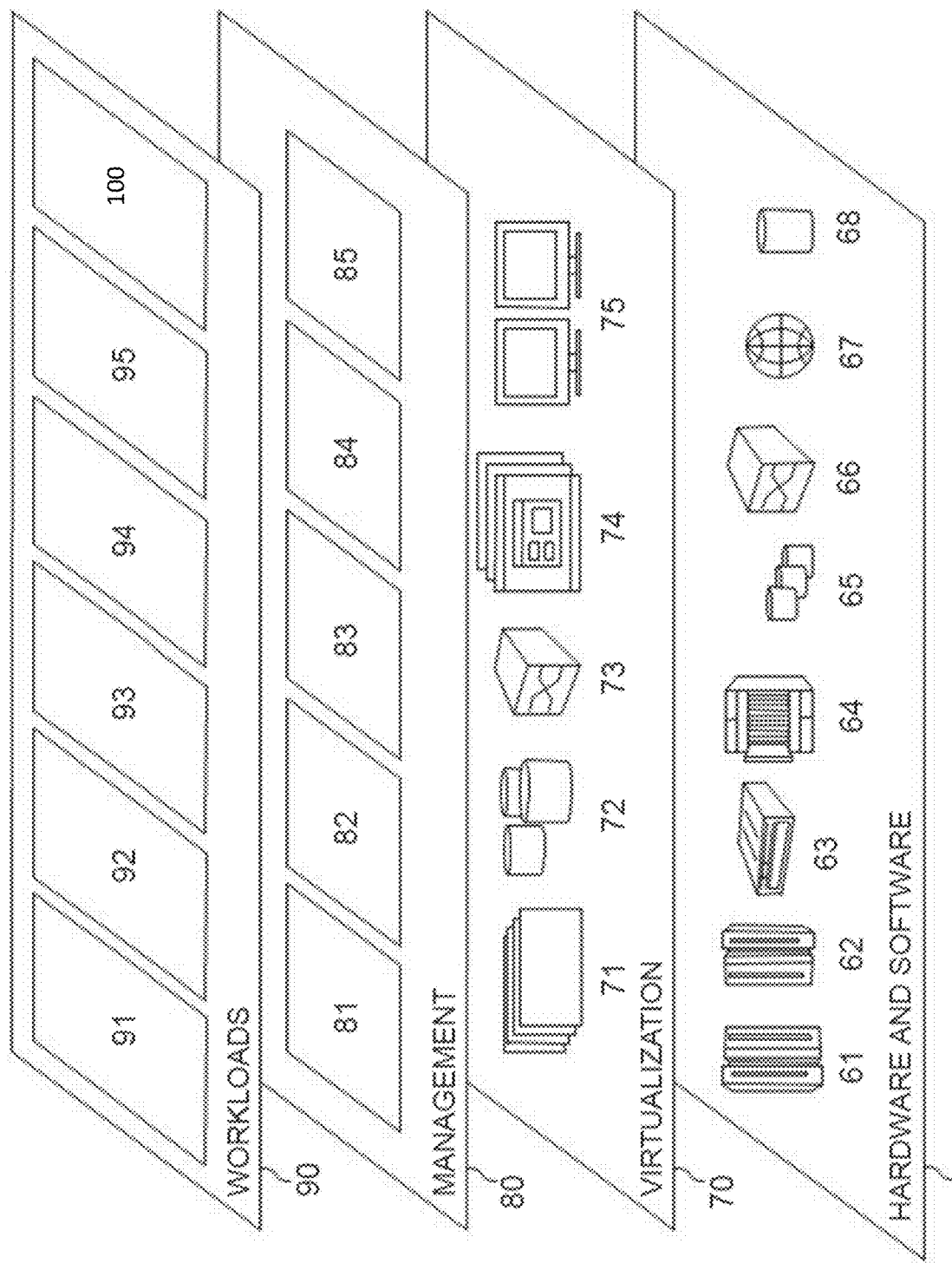
FIG. 12 depicts abstraction model layers according to an embodiment of the present invention.

Referring now to FIG. 12, an exemplary set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the graphical event model method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented graphical event model method, the method comprising:
learning, without respect to a domain of data, statistical and causal co-occurrence relationships among multiple event-types of the data based on inter-event times between event labels in the data;
requiring no complex input; and
generating a representation that explains a mutual dynamic of the multiple event-types in a form of a graphical event model that automatically learns from the data,
wherein, when a node in the graphical event model has a single parent, a number of local maxima are discovered from the inter-event times in the data, thereby computing a global maximum by comparing all local maxima.

2. The computer-implemented method of claim 1, wherein the learning the statistical and causal co-occurrence relationships assumes only a time-stamped, asynchronous, and irregularly-spaced event occurrence of the data on a time line spanning the multiple event-types as an input.

3. The computer-implemented method of claim 1, further comprising learning from the multiple event-types using the graphical event model by considering a most recent event history and an optimal proximal window size using the inter-event times between event labels in the data.

4. The computer-implemented method of claim 1, further comprising learning an expected duration between connected occurrences involving the multiple event-types and using the expected duration in estimating the statistical and causal co-occurrence relationships among the multiple event-types based on a most recent history.

5. The computer-implemented method of claim 2, further comprising learning an expected duration between connected occurrences involving the multiple event-types and using the expected duration in estimating the statistical and causal co-occurrence relationships among the multiple event-types based on a most recent history.

6. The computer-implemented method of claim 1, further comprising, by considering a most recent history:
discovering an optimal window size;
discovering an optimal parent set; and
generating a causal sequence of potential future interdependent event-types that unfold in time using the optimal window size, the optimal parent set, and an estimate of respective occurrence times.

7. The computer-implemented method of claim 1, wherein parents in the graphical event model affect an instantaneous rate of observing an occurrence of a child event-type, and a dependence is automatically learnt from a history of past parent event-type occurrences.

8. The computer-implemented method of claim 1, wherein a conditional instantaneous intensity of a child event-type from the data is estimated from a model, and
wherein the conditional instantaneous intensity is conditional on both a presence and an absence of a parent event-type in a specified historical time window.

9. The computer-implemented method of claim 1, wherein relationships for the graphical event model are due to a computation that is preformed via at least one of:
an optimal window search that bounds a range of a possible impacting history;
an optimal parent search that bounds a number of parent or cause event-types for any event-type in the data; and
a forward and a backward search to iteratively find an optimal graph structure for the graphical event model.

10. The computer-implemented method of claim 1, wherein relationships for the graphical event model are due to a computation that is performed via each of:

an optimal window search that bounds a range of a possible impacting history;
an optimal parent search that bounds a number of parent or cause event-types for any event-type in the data; and
a forward and a backward search to iteratively find an optimal graph structure for the graphical event model.

11. The computer-implemented method of claim 1, wherein relationships for the graphical event model are due to a computation that is performed via at least two of:
an optimal window search that bounds a range of a possible impacting history;
an optimal parent search that bounds a number of parent or cause event-types for any event type in the data; and
a forward and a backward search to iteratively find an optimal graph structure for the graphical event model.

12. The computer-implemented method of claim 1, wherein relationships for the graphical event model are due to a computation that is performed via an optimal window search that bounds a range of a possible impacting history.

13. The computer-implemented method of claim 1, wherein relationships for the graphical event model are due to a computation that is performed via an optimal parent search that bounds a number of parent or cause event-types for any event-type in the data.

14. The computer-implemented method of claim 1, wherein relationships for the graphical event model are due to a computation that is performed via a forward and a backward search to iteratively find an optimal graph structure for the graphical event model.

15. The computer-implemented method of claim 1, wherein no user input is required, and
wherein the data comprises multivariate and marked asynchronous event stream data where each event has a time-stamp and a complex object that serves as a mark of a type of event-related detail.

16. The computer-implemented method of claim 1, embodied in a cloud-computing environment.

17. The computer-implemented method of claim 1, wherein the learning learns, without respect to the domain of data, the statistical and causal co-occurrence relationships among the multiple event-types of the data based on inter-event times between event labels in the data to result in a learned output of how the multiple event-types depend on each other and use the learned output to model a model of how the multiple event-types affect each other.

18. The computer-implemented method of claim 17, wherein the learning learns a structure of the model along with parameters, and
wherein a conditional instantaneous intensity of a child event-type from the data is estimated from the model, and
wherein the conditional instantaneous intensity is conditional on both a presence and an absence of a parent event-type in a specified historical time window.

19. A computer-implemented graphical event model method, the method comprising:
learning statistical and causal co-occurrence relationships among multiple event-types of data, where the learning the statistical and causal co-occurrence relationships assumes only a time-stamped, asynchronous, and irregularly spaced event occurrence of the data on a time line spanning the multiple event-types as an input; and
generating a representation that explains a mutual dynamic of the multiple event-types in a form of a graphical event model,
wherein a model fitting score for the graphical event model are based on a proximal conditional intensity model that estimates a conditional instantaneous intensity of a child event-type from the data, where the conditional instantaneous intensity is conditional on both a presence and an absence of a parent event-type in a specified historical time window, with an assumption of a piece-wise constant intensity for the conditional instantaneous intensity of a successor event type, with a different constant intensity corresponding to each parent-configuration state.

20. The computer-implemented method of claim 19, wherein no user input is required, and
wherein the data comprises multivariate and marked asynchronous event stream data where each event has a time-stamp and a complex object that serves as a mark of a type of event-related detail.

21. A graphical event model system, said system comprising:
a processor; and
a memory, the memory storing instructions to cause the processor to perform:
learning, without respect to a domain of data, statistical and causal co-occurrence relationships among multiple event-types of the data based on inter-event times between event labels in the data;
requiring no complex input; and
generating a representation that explains a mutual dynamic of the multiple event-types in a form of a graphical event model that automatically learns from the data,
wherein, when a node in the graphical event model has a single parent, a number of local maxima are discovered from the inter-event times in the data, thereby computing a global maximum by comparing all local maxima.

22. The system of claim 21, embodied in a cloud-computing environment.

23. A graphical event model system, said system comprising:
a processor; and
a memory, the memory storing instructions to cause the processor to perform:
learning statistical and causal co-occurrence relationships among multiple event-types of data, where the learning the statistical and causal co-occurrence relationships assumes only a time-stamped, asynchronous, and irregularly spaced event occurrence of the data on a time line spanning the multiple event-types as an input; and
generating a representation that explains a mutual dynamic of the multiple event-types in a form of a graphical event model,
wherein a model fitting score for the graphical event model are based on a proximal conditional intensity model that estimates a conditional instantaneous intensity of a child event-type from the data with an assumption of a piece-wise constant intensity for the conditional instantaneous intensity of a successor event-type, with a different constant intensity corresponding to each parent-configuration state.

24. The system of claim 23, wherein no user input is required, and
wherein the data comprises multivariate and marked asynchronous event stream data where each event has a time-stamp and a complex object that serves as a mark of a type of event-related detail.

25. A computer program product for graphical event modelling, the computer program product comprising a computer-readable storage medium having program instructions embodied therewith, the program instructions executable by a computer to cause the computer to perform:

learning, without respect to a domain of data, statistical and causal co-occurrence relationships among multiple event-types of the data based on inter-event times between event labels in the data;

requiring no complex input; and generating a representation that explains a mutual dynamic of the multiple event-types in a form of a graphical event model that automatically learns from the data, wherein, when a node in the graphical event model has a single parent, a number of local maxima are discovered from the inter-event times in the data, thereby computing a global maximum by comparing all local maxima.

* * * * *